(12) United States Patent
Sano (10) Patent No.: US 7,256,713 B2
(45) Date of Patent: Aug. 14, 2007

(54) ABSOLUTE ANGLE DETECTING DEVICE

(75) Inventor: Tadashi Sano, Miyagi-ken (JP)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 11/446,867

(22) Filed: Jun. 5, 2006

(65) Prior Publication Data

US 2006/0273931 A1    Dec. 7, 2006

(30) Foreign Application Priority Data

Jun. 7, 2005    (JP)    ............................. 2005-167124
May 12, 2006    (JP)    ............................. 2006-133467

(51) Int. Cl.
*H03M 1/22* (2006.01)
(52) U.S. Cl. ............................................. 341/3; 341/9
(58) Field of Classification Search .................. 341/3, 341/9, 15
See application file for complete search history.

(56) References Cited

U.S. PATENT DOCUMENTS

| | | | |
|---|---|---|---|
| 5,276,722 A * | 1/1994 | Aoki et al. .................... 377/49 |
| 5,332,895 A | 7/1994 | Rieder et al. ............ 250/231.4 |
| 5,687,103 A | 11/1997 | Hagl et al. .................. 702/150 |
| 5,901,003 A * | 5/1999 | Chainer et al. ............... 360/51 |
| 6,542,088 B1 | 4/2003 | Bielski et al. ......... 250/231.14 |
| 6,966,118 B2 * | 11/2005 | Sano .......................... 33/1 PT |
| 2006/0169879 A1* | 8/2006 | Urakawa ............... 250/231.13 |

FOREIGN PATENT DOCUMENTS

| | | |
|---|---|---|
| EP | 1 503 185 | 2/2005 |
| JP | 10-47952 | 2/1998 |

OTHER PUBLICATIONS

Copy of search report dated Aug. 18, 2006 for corresponding European Patent Application 06 01 1760.

* cited by examiner

*Primary Examiner*—Peguy JeanPierre
(74) *Attorney, Agent, or Firm*—Brinks Hofer Gilson & Lione (57) ABSTRACT

An absolute angle detecting device is provided. The absolute angle detecting device is composed of a first detecting element group that outputs a Gray code string for angle detection that detects a rotating angle in one sector of the multi-rotation body at required resolution, a second detecting element group and a third detecting element group that outputs a first and a second Gray code strings for sector identification. A rotating angle within one rotation (360 degrees) is detected by the Gray code for angle detection while setting one rotation of the multi-rotation body to one sector.

8 Claims, 7 Drawing Sheets

ABSOLUTE ANGLE DETECTING DEVICE

This application claims the benefit of Japanese Patent Application No. 2005-167124 filed in Japan on Jun. 7, 2005 and 2006-133467 filed in Japan on May 12, 2006, both incorporated by reference.

BACKGROUND

1. Field

An absolute angle detecting device is provided.

2. Related Art

An absolute angle detecting device is provided between a steering shaft and a body of an automobile. Generally, the technology in which the control of the damping force of a suspension, the shift position control of an automatic transmission, and the steering control of rear wheels in a four-wheeled motor vehicle, are performed on the basis of the rotating angle of the steering wheel, the steering speed, the steering direction, or the like, detected by means of the absolute angle detecting device, is known. The steering shaft is a multi-rotation body configured to rotate to the right or left direction for two to three rotations from a neutral position. Therefore, an absolute angle detecting device that is capable of detecting the angle of one or more rotations of the steering shaft is required.

An absolute angle detecting device detects the absolute angle at a certain resolution. The device uses a BCD code, an M-system code or a Gray code, for example. It is common for the absolute angle detecting device to use the Gray code. This is because only one bit varies constantly in each of a leading step and a trailing step in the concatenating Gray code and thereby timing pulses for reading are not required and it is beneficial for achieving high resolution (for example, refer to Japanese Unexamined Patent Application Publication No. 2000-28396).

In the absolute angle detecting device for use in the automobile, it is common that a rotatable angle of the steering shaft (for example, ±720 degrees through ±1080 degrees) is divided into a certain angle area called the "sector." A Gray code is assigned in the sector at a certain resolution. There are some types of the absolute angle detecting device that identify each of the sectors, such as the rotation of the rotary disk that is connected to a steering shaft via a reduction gear mechanism such as a train of gears is detected by means of detecting element. A convolution-shaped groove is concentric with a rotation center of a rotary disk connected to a steering shaft is formed. An actuator of a linear position detecting device or a rotary position detecting device is inserted into the convolution-shaped groove. The rotation of the rotary disk is converted into an amount of displacement, so that the sector is detected up to one or more rotations of the steering shaft.

Since it is impossible to avoid a backlash or the like from the mechanical speed reduction mechanism, such as a train of gears, the combination of the convolution-shaped groove and the actuator, or the like, the deviation occurs at the timing for switching a digital code that detects an angle in a sector and a digital code for indicating the sector, in the sector identification device having such a mechanical speed reduction mechanism.

The deviation amount a is found by the equation: $\alpha = \pm m \cdot n$, where a detecting error of the sector due to the backlash or the like is defined as m degrees and a speed reduction ratio of the speed reduction mechanism is defined as n. As represented by the equation, the rotating angle of the multi-rotation body cannot be correctly detected because, the greater the speed reduction ratio becomes, for example, the greater the detecting angle area becomes, the greater the deviation amount $\alpha$ becomes.

SUMMARY

An absolute angle detecting device includes a first rotary disk connected to a rotating body that performs multiple rotation. A first code pattern row is provided on a circle of the first rotary disk. A first detecting element group composed of a plurality of detecting elements is arranged opposite to the first code pattern row. A second rotary disk is connected to the rotating body via a reduction gear mechanism and rotates at a reduced speed in relation to the rotating body. A second code pattern row and a third code pattern row are provided on different circles of the second rotary disk. A second detecting element group composed of a plurality of detecting elements is arranged opposite to the second code pattern row. A third detecting element group composed of a plurality of detecting elements is arranged opposite to the third code pattern row.

A plurality of sectors is formed by dividing an angle detecting area of the rotating body at even amount. A Gray code string for angle detection detects a rotating angle in each sector of the plurality of sectors at a predetermined resolution. The Gray code composed of a combination of codes is supplied from the first detecting element group. And a first code string for sector identification and a second code string for sector identification identifies each of the sectors.

The sectors are composed of a combination of codes supplied from the second detecting element group and the third detecting element group, in which the Gray code string for angle detection is configured to have a relationship to vary by one bit at each step in each of the sectors, and to vary by one bit from a first code to a last code in each of the sectors. A code in each of the sectors deviates by one digit every predetermined number of steps. Codes at the steps at a same position in each of the sectors are configured to be equivalent.

The first code string for sector identification is configured when a maximum deviation angle between the code of the same and the code of the gray code string for angle detection caused by the reduction gear mechanism is defined as $\alpha$. An angle assigned to one code is defined as $\beta$. $\beta$ is found by a following equation: $\beta = n \cdot \alpha$ (n is an integral number equal to 3 or more). The number of the steps of the first code string for sector identification is equal to or more than a total number of the plurality of sectors.

The second code string for sector identification is configured when an angle assigned to one code is defined as $\gamma$. $\gamma$ is found by following equation: $\gamma = m \cdot \alpha$ (m is an integral number equal to 3 or more). The following inequality is satisfied: $\gamma \leq l \cdot \beta$ (l is an integral number from 1 through 4.). The number of the steps of the second code string for sector identification is equal to or less than a total number of the plurality of sectors.

The first and second code strings for sector identification are formed of a Gray code whose code varies by one bit between each of the adjoining steps. A relative angle difference between a changeover portion of each of the sectors and a changeover portion of each of the steps constitutes the first code string for sector identification. A relative angle difference between the changeover portion of each of the sectors and a changeover portion of each of the steps that constitute the second code string for sector identification are set to a value obtained from multiplying a by an integral number equal to zero or more.

The present embodiment is able to correctly detect the rotating angle of the multi-rotation body, by a combination of each of the codes of Gray code string and the first code string for sector identification, as long as the code of the gray code string for angle detection and the code of the first code string for sector identification are within the area of the maximum deviation angle α, when each bit in the Gray code string for angle detection and each bit in the first and second code strings for sector identification are correctly detected.

The present embodiment is able to check an output error when an output error of one bit occurs in the Gray code string for angle detection in which an initialization is correctly performed, by constantly checking the consecutiveness of the Gray code string and ensuring that it varies by one bit.

The present embodiment is able to prevent a continuous detection of erroneous angle over a wide angle area, when an error of one bit occurs in the Gray code string for angle detection due to damage of one of detecting elements of the first detecting element group before the initialization is completed.

The present embodiment is able to check existence or nonexistence of an output error in the rotating area in an extent from 1 to 2 steps (in an extent of from 1.5 to 3.0 degrees) in a case of 10-bit Gray code having a resolution of 1.5 degrees whose one sector is set to 360 degrees, although differed by the number of the bit of the code of the Gray code, for example, for angle detection or bit redundancy.

The present embodiment is able to correctly detect the rotating angle of the multi-rotation body by means of referring to each of the codes of the first code string for sector identification and the Gray code string for angle detection, when an output error of one bit occurs in the first code string for sector identification before the initialization is completed and the angle in the Gray code for angle detection is erroneously detected as the angle belonging in the sector next to the sector to be essentially detected.

The present embodiment is able to correctly detect the output error by confirming that the code detected is not of a combination of the code of the essential first code string for sector identification and the essential second code string for sector identification, by means of referring each of the codes of the first code string for sector identification and the second code string for sector identification, in a case that the code of the Gray code string for angle detection detected is erroneously detected as the code belonging the sector other than the sector next to the sector to be essentially detected.

DRAWINGS

FIGS. 5A through 5D are tables that illustrate a Gray code that detects an angle outputted from a first detecting element group of the absolute angle detecting device.

DESCRIPTION

An example of an absolute angle detecting device of the present invention will be explained with reference to FIGS. 1 through 6.

Figure 1:
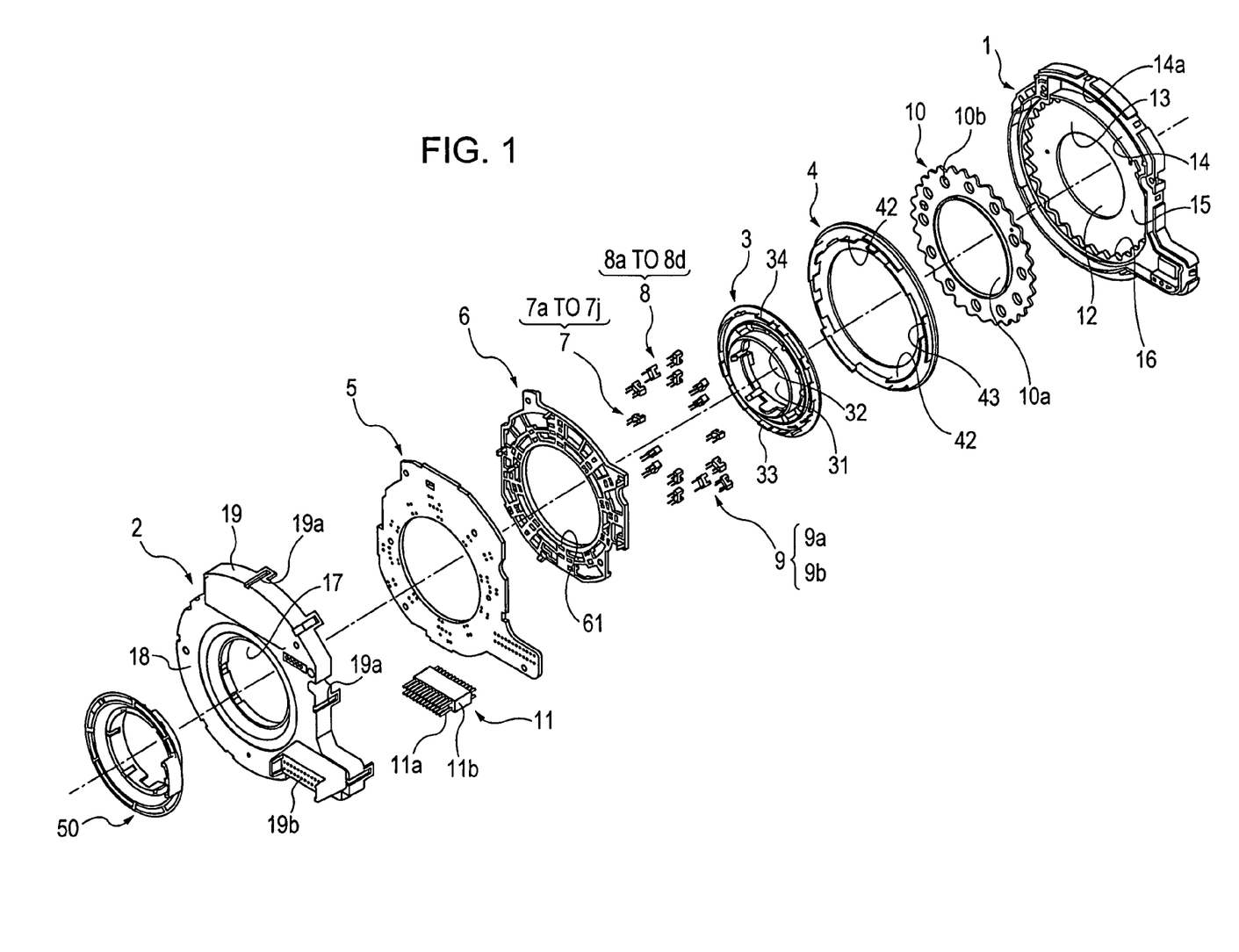
FIG. 1 is an exploded perspective view that illustrates an absolute angle detecting device.

As illustrated in FIG. 1, the absolute angle detecting device of the present invention is basically composed of a case 1, a case 2, a first rotary disk 3 and a second rotary disk 4 being mutually rotatable and housed in a housing. The housing is formed by combining the cases, 1 and 2, and main planes of which share approximately the same plane. A circuit board 5 is mounted on an inner surface of the first case 1. A signal detecting element receiving member 6 is attached to the circuit board 5.

The absolute angle detecting device is further composed of detecting elements, 7a through 7j, that serves as a first detecting element group 7. Detecting elements, 8a through 8d, serve as a second detecting element group 8. Detecting elements, 9a and 9b, serve as a third detecting element group 9. The total of these 16 detecting elements that are housed in the signal detecting element receiving member 6 at a predetermined arrangement, and the terminal portions that are electrically connected to terminal portions that are formed in the circuit board 5.

The absolute angle detecting device is still further composed of a converting device (not shown) that converts codes supplied from the above-mentioned 16 detecting elements, 7a through 7j, 8a through 8d, and 9a and 9b, into a rotating angle of the first rotating disk 3. A planetary gear 10 is driven by the first rotary disk 3 and drives the second rotary disk 4 at a predetermined reduced speed. Connector pins 11a whose one ends are attached to the circuit board 5 and the other ends face a connector insertion hole 19b being opened in the cover 2.

The case 1 is composed of a bottom plate 13 provided with a center opening 12, a peripheral wall 14 raised from an outer periphery of the bottom plate 13 at a certain height, and a circularly shaped rotary disk housing portion 15. In an internal surface of the rotary disk housing portion 15, an internal gear 16 is engaged with the planetary gear 10 is formed in a concentric manner with a rotation shaft (steering shaft) of a multi-rotation body, for example, in a concentric manner with the center opening 12. Further, a hooking claw 14a that combines the cover 2 with the cover 1 in a manner so as to snap together is formed on an outer surface of the peripheral wall 14.

The cover 2 is composed of a top plate 18 that has a center opening and a peripheral wall 19 raised inward from an outer peripheral edge of the top plate 18, and is formed in approximately the same shape and the same size as that of the case 1.

The case 1 and the cover 2 are integrally formed by means of hooking the hooking claw 12b formed in the case 1 with the hooking hole 19a formed in the cover 2, and forms a housing for housing other members, for example, parts 3 through 11.

The first rotary disk 3 is provided with a center opening 31 and a cylindrically shaped rotation body connecting portion 32 that is raised from the center opening 31.

Figure 4:
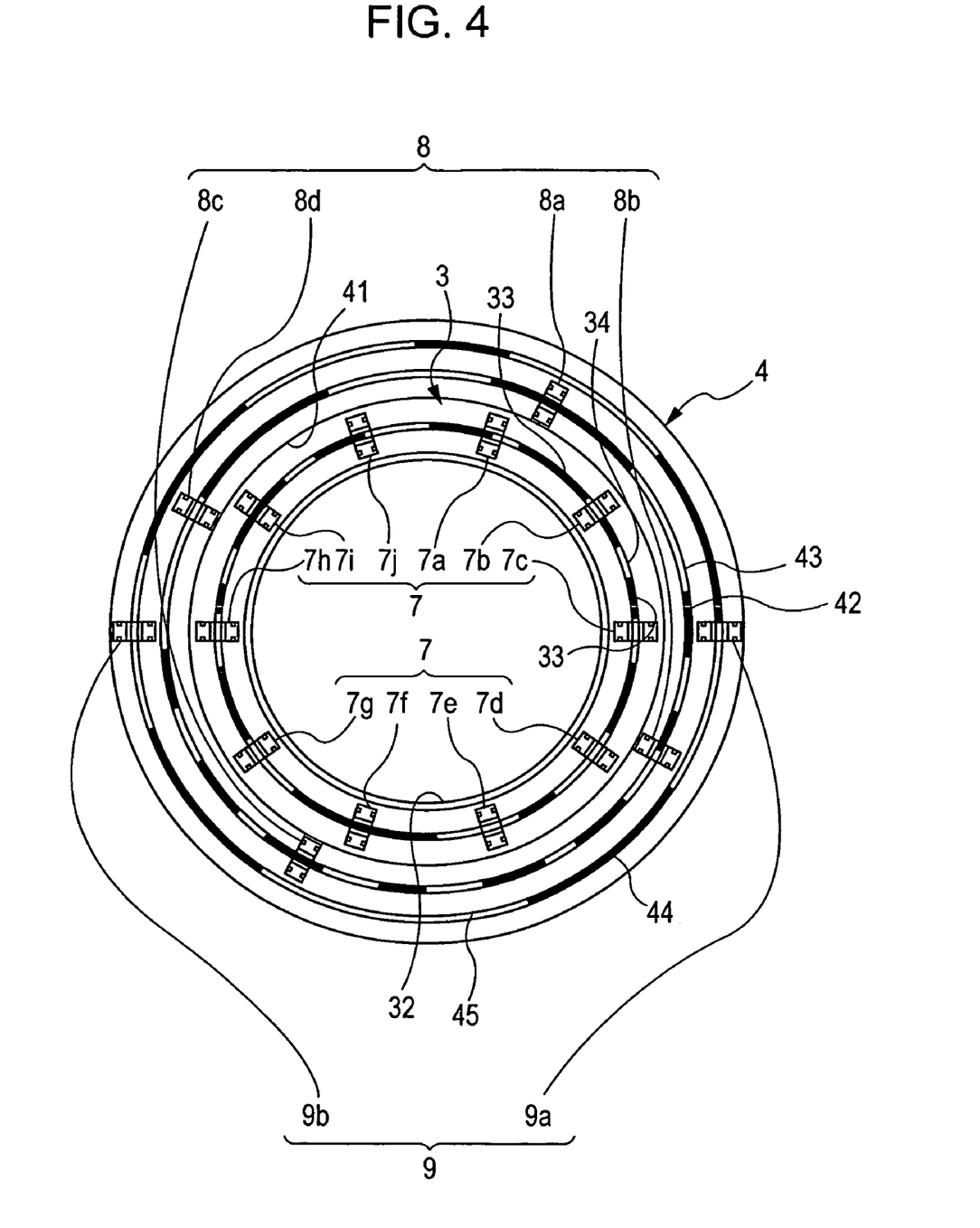
FIG. 4 is an explanatory view that illustrates an assembling condition of a first rotary disk, a second rotary disk, and a detecting element.

A first code pattern row 34, shown in FIG. 4, constructed by protruding a number of interrupting plates 33 for signal detection at a required arrangement are formed in a concentric manner with a center of the first rotary disk 3 at one side thereof where the rotation body connecting portion is protruded. The first rotary disk 3 is fixed to a multi-rotation body (not shown), for example, a steering shaft being penetrated into the center opening 31, and rotates with the multi-rotation body.

Figure 2:
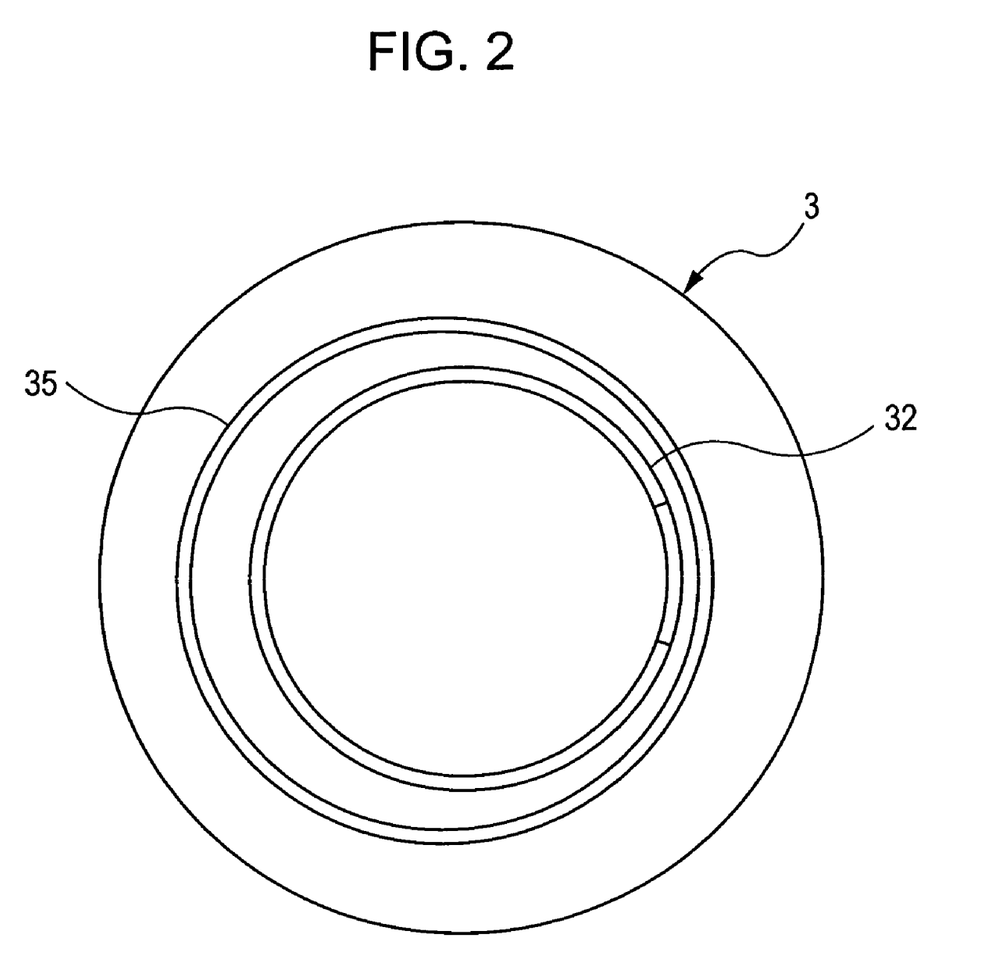
FIG. 2 is a backside view that illustrates a first rotary disk.

A ring-shaped planetary gear that contacts portion 35 causes the planetary gear 10 to perform the rotation and revolution while being in contact with an inner peripheral edge of an opening 10a of the planetary gear 10 at an inner periphery of an internal gear 16, is protruded in an eccentric manner in relation to the rotation shaft of the multi-rotation body at the backside of the first rotary disk 3, as shown in FIG. 2. (hereinafter revolution is referred to as orbital motion about a point, especially as distinguished from axial rotation) The first rotary disk 3 is connected to a rotor 50 inserted through the center opening 17 from outside the cover 2.

The second rotary disk 4 is provided with a center opening 41 whose rotation axis is configured in a concentric manner with a rotating shaft of the multi-rotation body, and a second code pattern row 43 constructed by protruding a number of interrupting plates 42 for signal detection at a required arrangement and a third code pattern row 45 constructed by protruding a number of interrupting plates 44 for signal detection at a required arrangement are formed in a concentric manner with a center of the second rotary disk 4 at one side thereof.

Figure 3:
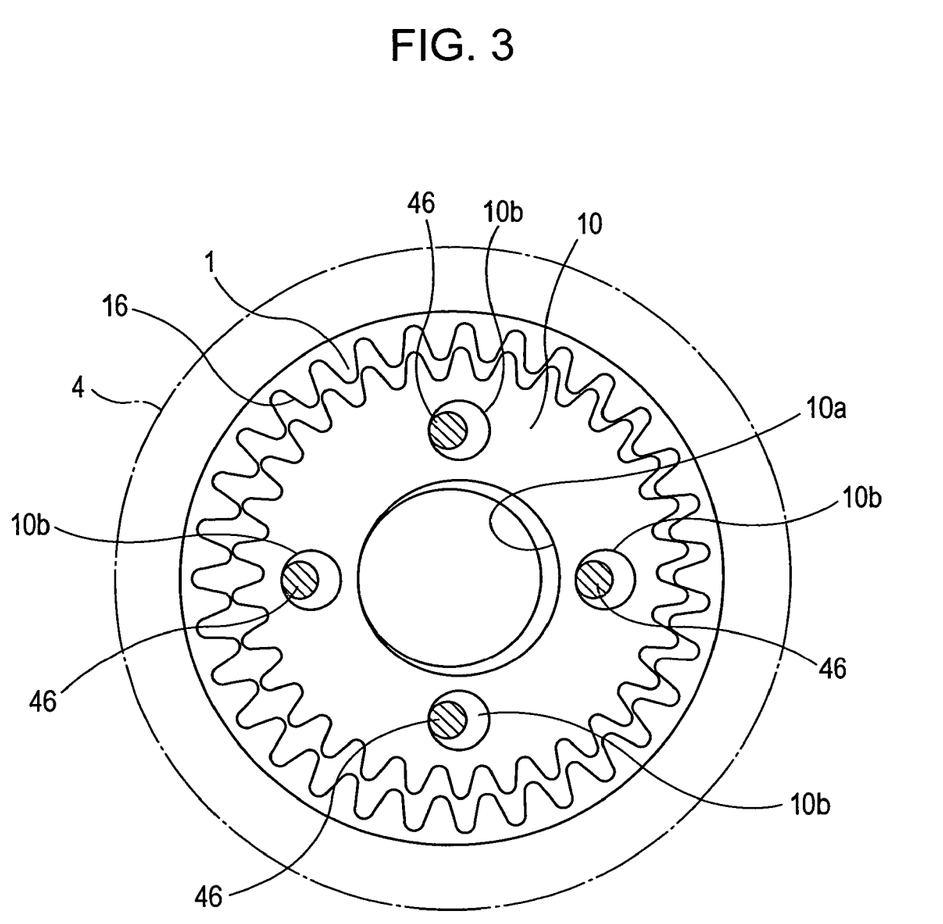
FIG. 3 is an inside view of a case that illustrates a connecting condition of a planetary gear, an inner gear, and a second rotary disk.

A plurality of hooking projections 46 for connecting the planetary gear 10 is protruded at even intervals at a backside of the second rotary disk 4, as shown in FIG. 3.

The circuit board 5 is formed into a shape capable of being housed in a circuit board housing portion 15 of both the case 1 and the cover 2, and a required circuit pattern including terminal portions for electrically connecting terminal portions of the detecting elements, 7a through 7j, 8a through 8d, and 9a and 9b, and the connector pins 11a are formed at a surface thereof.

The planetary gear 10 and the internal gear 16 that construct a reduction gear mechanism will be explained. A plurality of ring-shaped hooking holes 10b is formed around the opening 10a of the planetary gear 10 at even intervals. The planetary gear contacting portion 35 formed on the first rotary disk 3 is engaged with the inner periphery of the center opening 10a so that the planetary gear contacting portion 35 is rotated in the eccentric manner with the rotation shaft of the multi-rotation body. The hooking projections 46 provided at the backside of the second rotary disk 4 are engaged with each of the engaging holes 10b, as shown in FIG. 3. When the first rotary disk 3 is rotated, the planetary gear contacting portion 35 is rotated while being closely engaged with the inner periphery of the center opening 10a. The planetary gear 10 is caused to perform the rotation and revolution in the inner periphery of the internal gear 16 being engaged with the internal gear 16 in the case 1.

The number of teeth of the planetary gear 10 and that of the internal gear 16 are set for the second rotary disk 4 to rotate in a reduced speed in relation to the first rotary disk 3. For example, when the number of teeth of the internal gear 16 is set to 31 and that of the planetary gear is set to 30, the speed reduction ratio of the second rotary disk 4 in relation to the first rotary disk 3 can be one thirtieth. Thus, the second rotary disk 4 functions as a rotation transmitting portion that is rotated by a rotation of the planetary gear 10 being arranged in a manner so as to be concentric with a rotating shaft of the multi-rotation body, and is rotated at a reduced speed in relation to the first rotary disk 3.

The connector 11 is composed of the required number of connector pins 11a and an insulating resin made holding portion 11b that holds each of the connector pins 11a at a required arrangement. One end of the connector pin 11a is connected to the circuit board 5 and the other end thereof is arranged in a manner to face a connector insertion hole 19b being opened in the cover 2.

The signal detecting element receiving member 6 is provided with a detecting element attaching portion 61 that is partitioned to attach the plurality of detecting elements, 7a through 7j, 8a through 8d, and 9a and 9b, arranging at a predetermined disposition, and is screw-fixed on the circuit board 5.

As shown in FIG. 4, the detecting elements, 7a through 7j, that constitute the first detecting element group 7 is arranged opposite to the first code pattern row 34 formed in the first rotary disk 3, and the detecting elements, 8a through 8d, that constitute the second detecting element group 8 are arranged opposite to the second code pattern row 43 formed in the second rotary disk 4, and in addition, the detecting elements, 9a and 9b, that constitute the third detecting element group 9 are arranged opposite to the third code pattern row 45 formed in the second rotary disk 4. The first code pattern row 34, the second code pattern row 43, and the third code pattern row 45 are respectively composed of the interrupting plates, 33, 42, and 44 (black out portion in the figure), and spaces.

Figure 5A:
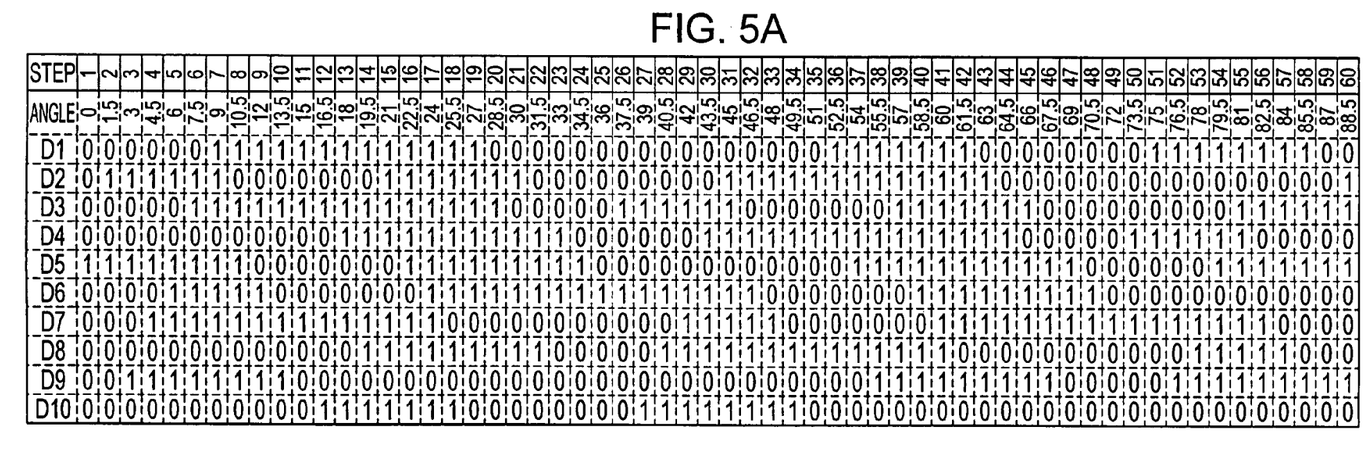
Figure 5B:
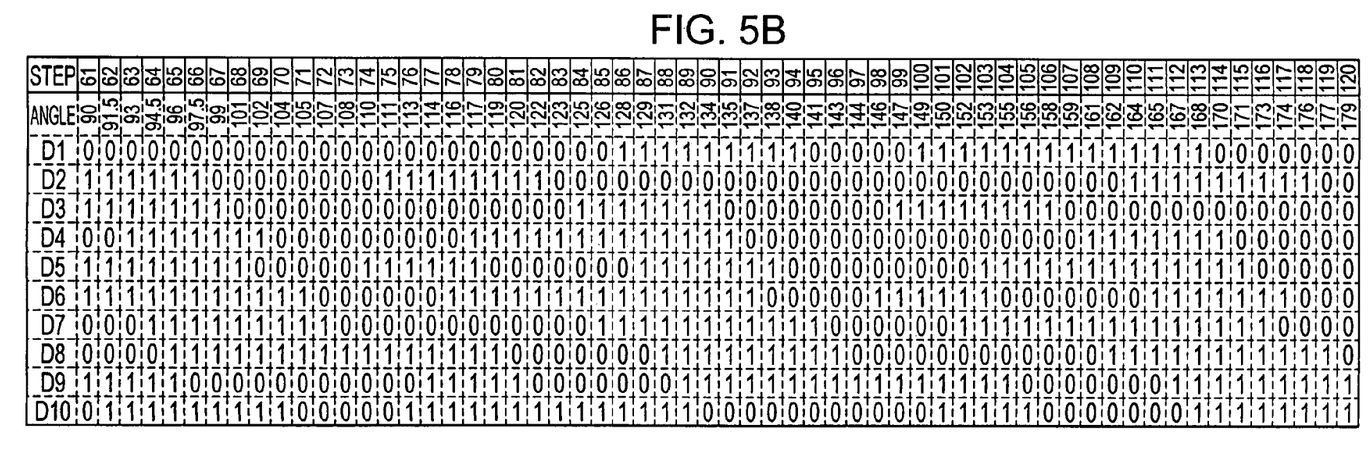
Figure 6:
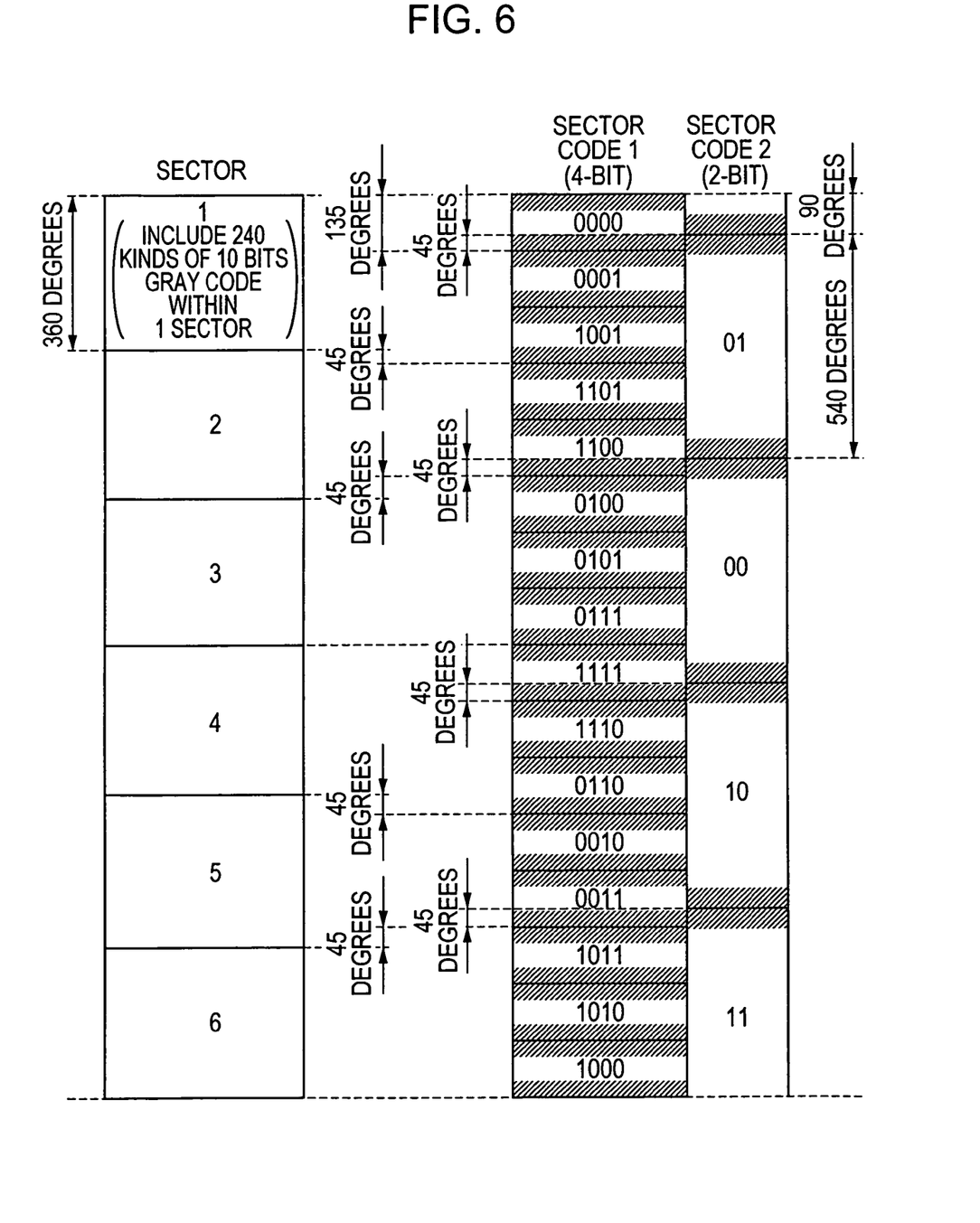
FIG. 6 is a table that illustrates a mutual relation of each of the Gray codes outputted from the first to the third detecting element groups of the absolute angle detecting device.

A positional relationship between the interrupting plates 33 and the detecting elements, 7a through 7j, on angle is primarily established by means of a 10-bit Gray code that constitutes the sector (1 sector is set to 360 degrees), shown in FIG. 6, namely by means of the Gray code, shown in FIGS. 5A through 5D. A relationship between the interrupting plates 42 and the detecting elements, 8a through 8d, on angle is primarily established by means of a relationship between the 10-bit Gray code and a 4-bit Gray code that constitutes a first code string for sector identification (sector code 1) in the sector, shown in FIG. 6, an angle to be assigned to 1 sector and each step of the first code string for sector identification, and an angle formed by a changeover portion of each sector and a changeover portion of each step that constitutes the first code string for sector identification, i.e., a relative angle difference.

A relationship between the interrupting plates 44 and the detecting elements, 9a and 9b, on angle is primarily established by means of an angle assigned to each step of the first code string for sector identification, as shown in FIG. 6. A relative angle difference between the changeover portion of the step of the first code string for sector identification and a changeover portion of the step constitutes a second code string for sector identification (sector code 2). The detecting elements, 7a through 7j, 8a through 8d, and 9a and 9b, photo-interrupter where a light emitting element and a light accepting element are integrally combined is used, and the converting device is constructed, for example, by means of an integrated circuit.

A Gray code string for angle detection will be explained referring to FIGS. 5 and 6. One sector is set to 360 degrees (one rotation), which is obtained by dividing ±3 rotations, for example, a rotation detecting area of the first rotary disk 1, by 6, and sectors, 1 through 6, are formed, as shown in FIG. 6. The Gray code string (10-bit Gray code in FIG. 5) for angle detection composed of a combination of codes supplied from the detecting elements, 7a though 7j, including 240 steps having a resolution of 1.5 degrees is formed in each sector.

The first code string for sector identification is provided in order to identify the sector for the code string to be essentially belonged, by referring to the code in the code string and a code in the Gray code string for detecting the rotating angle. The Gray code (4-bit Gray code) of 16 steps composed of a combination of the codes supplied from the detecting elements 8*a* through 8*d* is formed corresponding to the sectors 1 through 6. One step of the first Gray code string for sector identification, 135 degree is assigned.

A maximum deviation angle that can be calculated on as a deviation angle caused between each of the code strings of the first rotary disk 3 and the second rotary disk 4 due to the reduction gear mechanism is the angle found from multiplying a deviation angle calculated on a dimension error, an assembling error, or the like of each part that constitutes the reduction gear mechanism, by a reduction ratio. The angle to be assigned to one code in the first Gray code string for sector identification is required to be configured such that the angle satisfies a value found from multiplying the maximum deviation amount by an integral number equal to 3 or more, and a total number of the steps of the first Gray code string for sector identification is greater than a total number of the sectors.

The second code string for sector identification is provided for enabling the detection of an output error that occurs in the first code string for sector identification by referring to the code in the second string for sector identification and a code in the first Gray code string for sector identification. The second code string for sector identification is configured such that a 2-bit Gray code of 4 steps where an angle to be assigned to one step is 540 degrees corresponds to the sectors, 1 through 6.

The angle to be assigned to one code in the second code string for sector identification is set to a value equal to or more than 3 times as many times as an allowable deviation angle, and to a value obtained from multiplying an angle to be assigned to one code in the first code string for sector identification by an integral number from 1 through 4.

The first and second code strings for sector identification are constituted by a Gray code string in which a code string varies by one bit between each of adjoining steps, and a relative angle difference between a changeover portion of each sector and a changeover portion of the step constituting the first code string for sector identification, and a relative angle difference between a changeover portion of each sector and the a changeover portion of each step constituting the second code string for sector identification, is set to a value found from multiplying an angle assigned to one code in the first code string for sector identification by an integral number equal to zero or more. For example, in FIG. 6, the relative angle difference between the changeover portion between the code strings (0000) and (0001) in the first code string for sector identification, and the changeover portion between the code strings (11) and (01) in the second code string for sector identification is an angle corresponding to a maximum deviation angle, i.e., 45 degrees.

The Gray code string for angle detection is configured such that each of the codes varies by one bit at each step, and is configured to have a relationship in which the last code varies from the first code by one bit at each sector. The Gray code string for angle detection is configured such that the code in each sector is deviated by one digit at each of the predetermined number of steps, and that the code in the step at the same position in each sector is equivalent.

For example, each code of the Gray code for angle detection varies by one bit at each step, as shown in FIG. 5, and is configured to be a Gray code having a relationship in which the last code (0001100000) varies from the first code (0000100000) by one bit in an initial one sector. In addition, the code (0100100010) of the step 3 in the sector 1 is equivalent to the code of the step 3 in the sectors, 2, 3, etc., (not shown), and as a result, the code string of the steps, 1 through 240 in the sector 1 is repeated in the same pattern of the sectors, 2, 3, through 16 in each sector.

The "predetermined number" here refers to a quotient found from dividing the number of the codes formed in each sector by the number of the codes constituting the Gray code string for angle detection. In concrete terms, when the angle formed by sectors is defined as "B" degrees, the resolution to be realized is defined as "b", and the number of the codes constituting the code string that forms each step is defined as "n" (even number), the number of steps formed in the sector is found to be B/b. Therefore, the "predetermined number" is defined by the quotient B/(b·n) found from dividing the number of steps "B/b" by the number of the codes "n" forming the code string. Further, so as for the Gray code to have cyclicity, the number of the steps in each sector is required to be even numbers.

As described above, when the Gray code string for angle detection is brought to have cyclicity for a plurality of sectors, each code constantly varies by one bit in the sector and between the sectors. Accurate angle detection can be easily performed without using the timing pulses or the like and therefore, a rotating angle can be correctly detected even when the phases of the signals are deviated due to physical factors. Since a positional relationship on angles among each of the detecting elements, 7*a* through 7*j*, constituting the first detecting element group 7, the interrupting plate 33 constituting the first code pattern row 34, or the spaces is brought to be similar, each of the detecting elements, 7*a* through 7*j*, of the first detecting element group 7 can be arranged along the first code pattern row 34 at even intervals. The first and second code strings for sector identification of the present invention are also the cyclic Gray codes.

In the absolute angle detecting device, the rotating angle of the multi-rotation body can be correctly detected by referring to each code in the Gray code string for angle detection and the first code string for sector identification, in a case that the Gray code string for angle detection and each of the bits in the first and second code strings for sector identification are correctly detected, respectively, and as long as the deviation angle between each of the code strings in the Gray code string for angle detection and the first code string for sector identification is within 45 degrees. For example, when the Gray code string for angle detection is the code (1011101000) in the step 237, and the code in the first code string for sector identification is (0110), the angle is correctly detected as 354 degrees in the sector 4 (1.5× (237−1)).

When an output error of 1 bit occurs in the Gray code for angle detection, and the output error of 1 bit occurs in the Gray code string for angle detection after initialization is correctly performed, the error can be detected by constantly checking the consecutiveness resulting from that the Gray code is formed, namely the consecutiveness resulting from that the Gray code varies by one bit. For example, when the code varies from (0100111010) of the step 5 to (11001111110), since the variation between the codes is two bits, the fact that an output error occurs in the first code string for sector identification can be detected. Even when an error of one bit occurs in the Gray code string for angle detection in one sector due to that one of the detecting elements, 7*a* through 7*j* of the first detecting element group 7 is damaged before the initialization is completed, it represents the fact that the order of the essential Gray code is different, and continuous detection for erroneous angle for a wide angle area can be prevented. Although it differs depending on the number of the bits in the code in the Gray code string for angle detection, bit redundancy, or the like, for example, existence or nonexistence of the output error can be checked in a rotation area for an extent from 1 to 2 steps (from 1.5 to 3.0 degrees) in a case of the 10-bit Gray code having the resolution of 1.5 degrees, whose one sector is set to 360 degrees.

Further, even in a case that an output error of one bit occurs in the first code string for sector identification before completing initialization, and that the Gray code string for angle detection is erroneously detected as an angle belonging to the sector next to the sector to be detected, the rotating angle of the multi-rotation body can be correctly detected by referring to each of code strings of the first code string for sector identification and the Gray code string for angle detection. For example, in a case that a code (0010011010) of the step 155 detected as a Gray code string for angle detection is erroneously detected as the code to be belonged to the code string (0110), next to the first code string for sector identification (1110) where the code (0010011010) of the step 155 is to be essentially belonged, the correct angle can be detected by referring to the code (1110) of the first code string for sector identification and the code (0010011010) of the Gray code string for angle detection, upon deeming that the code (0010011010) of the step 155 does not belong to the first code string for sector identification (0110), but to the code (1110) next to the same.

In a case that an output error of one bit occurs in the first code string for sector identification before the initialization is completed, and that the code of the Gray code string for angle detection is erroneously detected as an angle that is belonged to a sector other than the sector next to the sector to be an essential detection object, the output error can be detected by confirming whether to be an essential combination of the first code string for sector identification and the second code string for sector identification, by means of referring to the first code string for sector identification and the second code string for sector identification.

For example, in a case that although a code of the first code string for sector identification is to be an essential code (1110), and that an output error of one bit occurs and is thereby detected as a code (1010) other than the adjoining codes (1111) and (0110), the output error can be detected because it is found that the codes are not a combination of the essential first code string for sector identification and the second code string for sector identification, by confirming the first code string for sector identification (1010) and the second code string for sector identification (10).

In a case that an error of one bit occurs in the first code string for sector identification before the initialization is completed, the detection of the output error becomes impossible when the combination of each of the codes of the first code string for sector identification and the second code string for sector identification are not confirmed whether the same is the essential combination, erroneous output code is deemed to be correct and the erroneous condition is kept up for one or more sectors.

Since the absolute angle detecting device of the embodiment outputs a cyclic Gray code for angle detection from the converting device and the first and second Gray code strings for sector identification where the code string varies by one bit between each of the adjoining steps, the algorithm that detects the absolute angle of the multi-rotation body can be simplified and the signal can be processed at high speed. The size of the circuit can be reduced and thereby miniaturization of the absolute angle detecting device can be achieved and the manufacturing cost can be reduced.

The absolute angle detecting device of the embodiment is configured such that one sector is set to 360 degrees, a rotating angle detecting area of the multi-rotation body is set to ±3 rotations, the allowable deviation angle α is set to 45 degrees, and the step is switched every 135 degrees of rotation of the first code string for sector identification. The step is switched every 540 degrees of rotation of the second code string for sector identification. The absolute angle of the multi-rotation body can be correctly detected within ±3 rotations, and even in a case that the large reduction gear mechanism having a speed reduction ratio of one over several tens, the influence of the backlash of the reduction gear mechanism can be eliminated. The present embodiment is applicable for a vehicle-mounted absolute angle detecting device in which the control of the damping force of a suspension, the shift position control of an automatic transmission, the steering control of rear wheels in a four-wheeled motor vehicle, or the like.

In the aforementioned embodiment, a 10-bit cyclic Gray code having a resolution of 1.5 degrees whose one sector is set to 360 degrees is outputted by a combination of the first code pattern row 34 and ten detecting elements, 7a through 7j, a total of 16 steps of the 4-bit Gray code strings whose bit variation between adjoining steps is one bit, and whose one step is set to 135 degrees is outputted by a combination of the second code pattern row 43 and four detecting elements, 8a through 8d, and a total of 4 steps of the 2-bit second Gray code strings whose bit variation between adjoining steps is one bit, and whose one step is set to 540 degrees, is outputted by a combination of third code pattern row 45 and the two detecting elements, 9a and 9b.

The present embodiment is not limited to the above described construction, and the arrangement of each of the code pattern rows, 34, 43, and 44, the number of each of the detecting elements, 7a through 7j, 8a through 8d, and, 9a and 9b, and the arrangement of the same, and the angles of each of the sectors and steps may be arbitrarily set without departing from a scope of the present embodiment.

In the embodiment described above, the detecting system for the signal is formed by means of a combination of the interrupting plate and the photo-interrupter. However, the scope of the present invention is not limited to the above, and the detecting system for the signal may be formed by a combination of an optical pattern, such as a through hole or a notch, and the photo-interrupter, a combination of a magnetic pattern and a magnetic detecting element, a combination of a resistive element pattern and a collecting brush, or the like.

What is claimed is:

1. An absolute angle detecting device comprising:
    a first rotary disk connected to a rotating body that performs multiple rotation;
    a first code pattern row provided on a circle of the first rotary disk;
    a first detecting element group composed of a plurality of detecting elements that are arranged opposite to the first code pattern row;
    a second rotary disk that is connected to the rotating body via a reduction gear mechanism and rotating at a reduced speed in relation to the rotating body;
    a second code pattern row and a third code pattern row provided on each of different circles of the second rotary disk;
    a second detecting element group composed of a plurality of detecting elements being arranged opposite to the second code pattern row;

a third detecting element group composed of a plurality of detecting elements being arranged opposite to the third code pattern row;

a plurality of sectors formed by dividing an angle detecting area of the rotating body at even amount;

a Gray code string for angle detection that detects a rotating angle in each sector of the plurality of sectors at a predetermined resolution, the Gray code composed of a combination of codes supplied from the first detecting element group; and a first code string for sector identification and a second code string for sector identification that identifies each of the sectors, composed of a combination of codes supplied from the second detecting element group and the third detecting element group, wherein the Gray code string for angle detection is configured to have a relationship to vary by one bit at each step in each of the sectors, and to vary by one bit from a first code to a last code in each of the sectors, and wherein a code in each of the sectors deviates by one digit every predetermined number of steps, and codes at the steps at a same position in each of the sectors are configured to be equivalent, and wherein the first code string for sector identification is configured such that when a maximum deviation angle between the code of the same and the code of the gray code string for angle detection caused by the reduction gear mechanism is defined as $\alpha$, and an angle assigned to one code is defined as $\beta$, $\beta$ is found by a following equation: $\beta = n \cdot \alpha$ (where n is an integral number equal to 3 or more), and the number of the steps of the first code string for sector identification is equal to or more than a total number of the plurality of sectors, and wherein the second code string for sector identification is configured such that when an angle assigned to one code is defined as $\gamma$, $\gamma$ is found by following equation: $\gamma = m \cdot \alpha$ (where m is an integral number equal to 3 or more), and following inequality is satisfied: $\gamma \leq 1 \cdot \beta$ (l is an integral number from 1 through 4.), and the number of the steps of the second code string for sector identification is equal to or less than a total number of the plurality of sectors, and wherein the first and second code strings for sector identification are formed of a Gray code whose code varies by one bit between each of the adjoining steps, and wherein a relative angle difference between a changeover portion of each of the sectors and a changeover portion of each of the steps constituting the first code string for sector identification, and a relative angle difference between the changeover portion of each of the sectors and a changeover portion of each of the steps constituting the second code string for sector identification are set to a value obtained from multiplying $\alpha$ by an integral number equal to zero or more.

2. The absolute angle detecting device according to claim 1, wherein one sector is set to 360 degrees, a rotating angle detecting area of the rotating body is set to ±3 rotations, the maximum deviation angle $\alpha$ is set to 45 degrees, the step is switched every 135-degree rotation of the first code string for sector identification, and step is further switched every 540-degree rotation of the second code string for sector identification.

3. An absolute angle detecting device that comprises: a first rotary disk connected to a rotating body that performs multiple rotation;

a first code pattern row provided on a circle of the first rotary disk;

a first detecting element group composed of a plurality of detecting elements that are arranged opposite to the first code pattern row;

a second rotary disk that is connected to the rotating body via a reduction gear mechanism and rotating at a reduced speed in relation to the rotating body;

a second code pattern row and a third code pattern row provided on each of different circles of the second rotary disk;

a second detecting element group composed of a plurality of detecting elements being arranged opposite to the second code pattern row;

a third detecting element group composed of a plurality of detecting elements being arranged opposite to the third code pattern row;

a plurality of sectors formed by dividing an angle detecting area of the rotating body at even amount;

a Gray code string for angle detection that detects a rotating angle in a sector of the plurality of sectors at a predetermined resolution, the Gray code composed of a combination of codes supplied from the first detecting element group; and a first code string for sector identification and a second code string for sector identification that identifies each of the sectors, composed of a combination of codes supplied from the second detecting element group and the third detecting element group.

4. The absolute angle detecting device according to claim 3, wherein the Gray code string for angle detection is configured to have a relationship to vary by one bit at each step in each of the sectors, and to vary by one bit from a first code to a last code in each of the sectors.

5. The absolute angle detecting device according to claim 4, wherein a code in each of the sectors deviates by one digit every predetermined number of steps, and codes at the steps at a same position in each of the sectors are configured to be equivalent.

6. The absolute angle detecting device according to claim 5, wherein the first code string for sector identification is configured such that when a maximum deviation angle between the code of the same and the code of the gray code string for angle detection caused by the reduction gear mechanism is defined as $\alpha$, and an angle assigned to one code is defined as $\beta$ (where $\beta$ is found by a following equation: $\beta = n \cdot \alpha$ (where n is an integral number equal to 3 or more)), and the number of the steps of the first code string for sector identification is equal to or more than a total number of the plurality of sectors.

7. The absolute angle detecting device according to claim 5, wherein the second code string for sector identification is configured such that when an angle assigned to one code is defined as $\gamma$ (where $\gamma$ is found by following equation: $\gamma = m \cdot \alpha$ (m is an integral number equal to 3 or more)), and the following inequality is satisfied: $\gamma \leq 1 \cdot \beta$ (where l is an integral number from 1 through 4.), and the number of the steps of the second code string for sector identification is equal to or less than a total number of the plurality of sectors.

8. The absolute angle detecting device according to claim 7, wherein the first and second code strings for sector identification are formed of a Gray code whose code varies by one bit between each of the adjoining steps.

* * * * *

UNITED STATES PATENT AND TRADEMARK OFFICE
CERTIFICATE OF CORRECTION

PATENT NO. : 7,256,713 B2
APPLICATION NO. : 11/446867
DATED : August 14, 2007
INVENTOR(S) : Tadashi Sano It is certified that error appears in the above-identified patent and that said Letters Patent is hereby corrected as shown below:

In the Claims

Column 10, in claim 1, line 27, after "and the code of the" delete "gray" and substitute --Gray-- in its place.

Column 12, in claim 6, line 44, after "same and the code of the" delete "gray" and substitute --Gray-- in its place.

Signed and Sealed this

Twenty-fifth Day of December, 2007

JON W. DUDAS
*Director of the United States Patent and Trademark Office*